US012583205B1

(12) United States Patent
Drevet et al.

(10) Patent No.: US 12,583,205 B1
(45) Date of Patent: Mar. 24, 2026

(54) MULTILAYER HYBRID MAGNESIUM OXIDE PRODUCTS AND METHODS THEREOF

(71) Applicant: Shaw Industries Group, Inc., Dalton, GA (US)

(72) Inventors: Anthony Drevet, Ringgold, GA (US); Christopher K. Andrews, Signal Mountain, TN (US)

(73) Assignee: Shaw Industries, Inc., Dalton, GA (US)

( * ) Notice: Subject to any disclaimer, the term of this patent is extended or adjusted under 35 U.S.C. 154(b) by 191 days.

(21) Appl. No.: 18/481,101

(22) Filed: Oct. 4, 2023

Related U.S. Application Data

(60) Provisional application No. 63/413,038, filed on Oct. 4, 2022.

(51) Int. Cl.
| | |
|---|---|
| *B32B 9/04* | (2006.01) |
| *B32B 7/02* | (2019.01) |
| *B32B 27/42* | (2006.01) |
| *B32B 37/10* | (2006.01) |
| *B32B 37/24* | (2006.01) |

(52) U.S. Cl.
CPC ............... *B32B 9/045* (2013.01); *B32B 7/02* (2013.01); *B32B 27/42* (2013.01); *B32B 37/10* (2013.01); *B32B 37/24* (2013.01); *B32B 2307/7376* (2023.05); *B32B 2309/02* (2013.01); *B32B 2309/12* (2013.01); *B32B 2315/00* (2013.01)

(58) Field of Classification Search
CPC ........... B32B 9/045; B32B 7/02; B32B 27/42; B32B 37/10; B32B 37/24; B32B 2307/7376; B32B 2309/02; B32B 2309/12; B32B 2315/00
See application file for complete search history.

(56) References Cited

U.S. PATENT DOCUMENTS

| | | | |
|---|---|---|---|
| 2008/0314296 A1* | 12/2008 | Wisenbaker, Jr. | .. B28B 23/0006 106/801 |
| 2009/0011279 A1* | 1/2009 | Wisenbaker, Jr. | ........ E04C 2/04 156/45 |
| 2009/0011670 A1* | 1/2009 | Wisenbaker, Jr. | ...... B32B 5/024 442/42 |
| 2009/0025850 A1* | 1/2009 | Feigin | .................... B32B 29/02 156/42 |
| 2009/0065972 A1* | 3/2009 | Feigin | .................... B32B 13/14 264/241 |

FOREIGN PATENT DOCUMENTS

| | | | | |
|---|---|---|---|---|
| EP | 2060389 A1 * | 5/2009 | ............. | C04B 28/30 |

* cited by examiner

*Primary Examiner* — Nathan L Van Sell
(74) *Attorney, Agent, or Firm* — Smith Gambrell & Russell LLP

(57) ABSTRACT

A magnesium oxide based product formed through a hybrid core. The hybrid core includes a dry layer made from a dry MgO composition and a wet layer from a wet MgO composition. The product can further be joined to an additional top layer to the hybrid core, including a laminate.

7 Claims, 4 Drawing Sheets

MULTILAYER HYBRID MAGNESIUM OXIDE PRODUCTS AND METHODS THEREOF

TECHNICAL FIELD

This disclosure relates to magnesium oxide products and methods thereof; and particularly to multilayer hybrid magnesium oxide products and related methods.

BACKGROUND

Magnesium oxide (MgO) based compositions exhibit a variety of properties such as, but not limited to, moisture resistance, fire resistance, and temperature stability, which make them attractive for use as a substrate for decorative surface covering products such as, but not limited to, flooring products. Such decorative surface covering products with an MgO based substrate may provide stability when used in wet environments, environments where the decorative flooring products are exposed to a wide range of temperatures, and other similar environs.

Other layers may need to be added to the MgO based decorative surface covering products to further enhance their utilization and value. For example, a top layer may be laminated on a decorative surface covering product with an MgO based substrate to increase such products' scratch-resistant properties.

SUMMARY

It is to be understood that this summary is not an extensive overview of the disclosure. This summary is exemplary and not restrictive and it is intended to neither identify key or critical elements of the disclosure nor delineate the scope thereof. The sole purpose of this summary is to explain and exemplify certain concepts of the disclosure as an introduction to the following complete and extensive detailed description.

The present disclosure relates to a magnesium oxide (MgO) based product that includes a multilayer hybrid core with a dry layer formed from a dry MgO composition and a wet layer formed from a wet MgO composition bonded to the dry layer. The MgO based product can also include outer layers joined to the hybrid core. In these aspects, the outer layers can be joined to the dry layer opposite the wet layer. The outer layer can include one or more layers that may be laminated to the core. The one or more layers that form the outer layer may include a layer comprising melamine. In such instances, the dry layer of the hybrid core absorbs water from the melamine to create a dry interface between the dry layer and the melamine.

In some instances, the MgO based product includes two dry layers sandwiching the wet layer. These dry layers can make up about 20% up to about 70% of a product thickness. The dry MgO composition of the MgO based product can include MgO, one or more salts, wood, and water. In such instances, the dry MgO composition includes at most about 5% water by weight and at least about 20% wood by weight. The wet MgO composition of the MgO based product can include MgO, one or more salts, wood, and water. In such instances, the wet MgO composition includes at least about 5% water by weight and at most about 20% wood by weight.

In other aspects, the invention is directed at a method of forming a MgO based product by forming a multilayer hybrid core by scattering a dry MgO composition onto a surface to form a first dry layer, spreading a wet MgO composition onto the dry layer of the dry MgO composition to form a wet layer, scattering additional dry MgO composition on the wet layer to form a second dry layer opposite the first dry layer, and bonding the three layers together. The bonding can be done through smooth rolling or hot pressing, at about 280 psi up to about 855 psi and/or at about 100° C. up to about 220° C. In some aspects, the dry MgO composition and the wet MgO composition have a different viscosity from one another. An outer layer can be added to the first and/or second dry layer of the hybrid core after the bonding occurs. The outer layer may include one or more layers that may be laminated (e.g., direct laminated) to the hybrid core, i.e., to the first or second dry layer of the hybrid core. The one or more layers forming the outer layer can include a layer comprising melamine. The laminating, i.e., lamination of the outer layers to the hybrid core can be done through hot pressing (or in some embodiments through cold pressing).

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

I. Definitions

Figure 1:
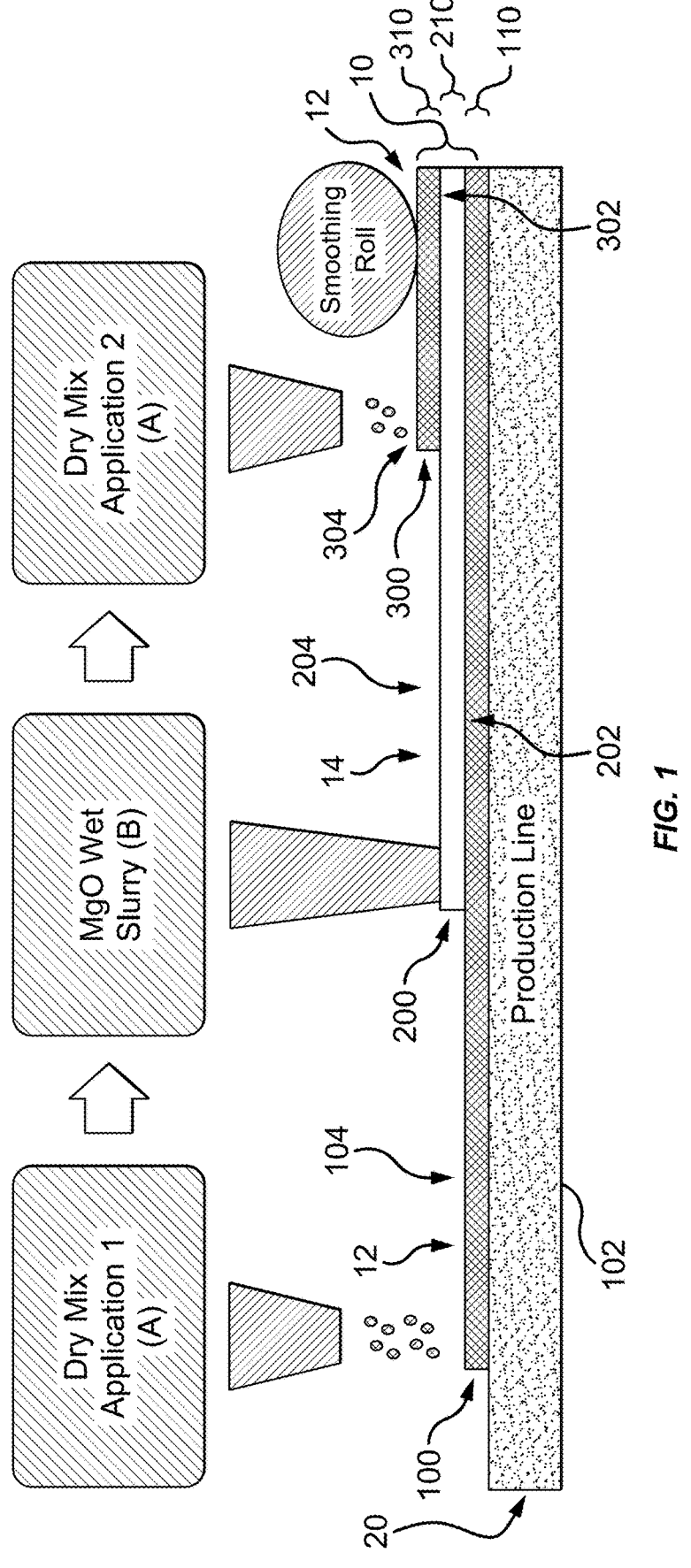
FIG. 1 depicts an example hybrid MgO process according to aspects of the present invention.

It should be appreciated that this disclosure is not limited to the compositions and methods described herein. It is also to be understood that the terminology used herein is for the purpose of describing certain embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any compositions, methods and materials similar or equivalent to those described herein can be used in the practice or testing of the present invention. All publications mentioned are incorporated herein by reference in their entirety.

The use of the terms "a," "an," "the," and similar referents in the context of describing the presently claimed invention (especially in the context of the claims) are to be construed to cover both the singular and the plural, unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein.

Use of the term "about" is intended to describe values either above or below the stated value in a range of approx. +/−10%; in other embodiments the values may range in value either above or below the stated value in a range of approx. +/−5%; in other embodiments the values may range in value either above or below the stated value in a range of approx. +/−2%; in other embodiments the values may range in value either above or below the stated value in a range of approx. +/−1%. The preceding ranges are intended to be made clear by context, and no further limitation is implied. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

As used herein, the term "MgO composition" or "MgO based composition" refers to a composition with MgO, salt(s), and additives. The additives may include, but are not limited to, wood fibers, and water. The salts can include one or more magnesium salts (e.g., magnesium chloride ($MgCl_2$), sulfides, phosphates, and the like). In some embodiments, the salts may include other salts such as calcium carbonate ($CaCO_3$). The MgO composition can also include additional materials, including, but not limited to, wood, bamboo, latex, melamine, cellulose, acrylic, perlite, fly ash, polypropylene (PP), polyethylene terephthalate (PET), hemp, natural fibers, and synthetic fibers.

As used herein a "dry MgO composition" refers to a MgO composition using less than 5% water by weight and more than 20% wood fiber by weight. In some example embodiments, the dry MgO composition may include less than 10% water by weight and more than 15% wood fiber by weight. In some examples, a dry composition refers to any MgO composition where all water introduced into a feedstock is absorbed by at least one other component of the feedstock. In such examples, no excess water will remain and fibers or particulate of a feedstock composition will not be suspended in water as to constitute a slurry. In such aspects, a dry MgO composition may be akin to a dry powder that can be spread onto a surface. Though such compositions may feel slightly wet when touched, no observable excess water exists to suspend fibers or particulate.

As used herein, a "wet MgO composition" refers to a MgO composition that uses more than about 5% water by weight and less than about 20% wood fiber by weight. In some example embodiments, the wet MgO composition may include less than 15% wood fiber by weight and more than 10% water by weight. In some examples, a wet composition refers to any MgO composition where not all water introduced into a feedstock is absorbed by at least one other component of the feedstock. In such examples, observable, excess water will remain and fibers or particulate of a feedstock composition will be suspended in water as to constitute a slurry. In such aspects, a wet MgO composition akin to a slurry can be extruded onto a surface.

As used herein, a "hybrid core" or "multilayer hybrid core" refers to a product that includes at least one layer formed from a wet MgO composition and at least one layer formed from a dry MgO composition.

As used herein, a "powder," "powdered substance," "powdered-like substance," "dry portion," or "dry powder" refers to the dry MgO composition. In some example embodiments, the dry composition may have some moisture (less than 5% water by weight) but may still retain a powder like form (e.g., like saw dust).

As used herein, a "slurry", "wet portion," or "wet slurry" refers to the wet MgO composition.

As used herein, "water stability" refers to the ability of a MgO-based product to retain dimensional features (e.g., length and width), shape (e.g., flatness), rigidity, and other such desired properties when in contact with water. In some examples, the term 'water stability' may refer to dimensional stability when exposed to moisture.

As used herein, "temperature stability" refers to the ability of a MgO-based product to retain dimensional features, shape (e.g., flatness), rigidity, and other such desired properties in the presence of extreme temperatures. In some examples, the term 'temperature stability' may refer to dimensional stability across a wide range of temperatures. A product having a low level of temperature stability (i.e. temperature instability) may warp or fail (e.g., expand, contract, edge lift, curl, cup, bow, etc.) when exposed to extreme temperatures or when exposed to large or small temperature variations, whereas a product comprising high temperature stability will not significantly warp or fail in extreme temperatures or when exposed to large or small temperature variations.

II. Hybrid Manufacturing of a Magnesium Oxide Product

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The current disclosure relates to a decorative MgO surface-covering product that includes a hybrid core having at least one layer of a dry MgO composition (i.e., a dry layer) and at least one layer of a wet MgO composition (i.e., a wet layer), the hybrid core configured to bond to additional layers (also interchangeably referred to as 'outer layers' or 'top layer(s)' throughout this disclosure) without the need for additional adhesives. In additional examples, a MgO product may be used for non-decorative applications. While it is possible additional layers can be added to both sides of the hybrid core, in most instances the additional layers will be added to only one side of the hybrid core. The additional layers added to the hybrid core can be a top layer that may include, a single layer or a laminate of multiple layers. The multiple layers may include, but is not limited to, a décor layer and a wear layer. In some examples, the décor and wear layer may be a single layer in which case the top layer may be a single layer. For example, décor paper impregnated with melamine. The top layer can be applied to either side of the hybrid core, but the top layer is intended to be a surface of the MgO product that is left exposed when in use (e.g., flooring, paneling, etc.). The top layer may or may not be pre-formed and directly laminated to the hybrid core. If the top layer is not pre-formed, then the different layers forming the top layer may be stacked and then laminated directly to the hybrid core. The utilization of the multilayer hybrid core with dry MgO composition and wet MgO composition layers provides several benefits, as described below.

Figure 2:
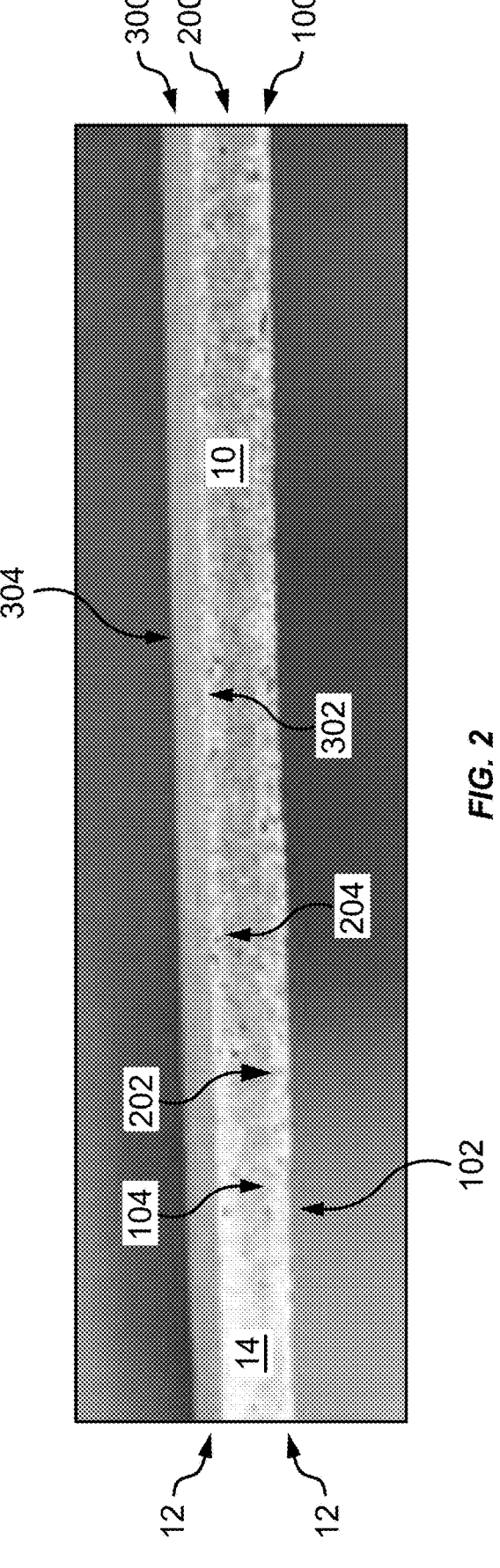
FIG. 2 shows an example MgO product made from the process illustrated in FIG. 1.

In an aspect, the hybrid core 10 includes at least one dry layer/portion 12 formed from a dry MgO composition, as shown in FIGS. 1-2. As described above, a dry MgO composition includes an MgO composition that includes MgO, one or more salts (e.g., magnesium chloride (MgCl$_2$), calcium carbonate (CaCO$_3$), sulfides, phosphates, and the like), wood, bamboo, latex, melamine, cellulose, acrylic, polypropylene (PP), polyethylene terephthalate (PET), hemp, natural fibers, synthetic fibers, water, and other such substances. The wood component of the MgO composition can come in the form of wood fibers, wood chips, wood flour, and other such substances known in the art. As a non-limiting example, the wood component of the MgO composition can also come in the form of cellulosic fibers, and the like. Further, the dry MgO composition includes at most about 5% water by weight and at least about 20% wood by weight.

The hybrid core 10 also includes at least one wet layer/portion/14 formed from the wet MgO composition. The wet MgO composition includes a MgO composition similar to the MgO composition of the dry MgO composition. In a similar aspect, a wood component of the wet MgO composition can come from the previously discussed sources (e.g. wood fibers, wood chips, cellulosic fibers, and the like). However, the wet MgO composition uses more than about 5% water by weight and less than about 20% wood fiber by weight.

The use of one or more dry layers/portions 12 as the outer layers (surface layers) of the multilayer hybrid core 10 allows for the application of top layers 400 to the hybrid core 10. The dry portion 12 facilitates said application due to the high wood fiber content (at least about 20% by weight) and low water content (at most 5% by weight) associated with the dry portion's 12 composition. An elevated wood content and a lower water content allows any moisture exiting a top layer 400 during its application to be absorbed by a dry portion 12, as further discussed below. In an exemplary aspect, a dry portion 12 may undergo further processing to form a dry core alone. In such an aspect, a dry core may comprise one or more dry portions 12 of one or more compositions in the absence of one or more wet portions of one or more compositions. One or more dry portions 12 of one or more compositions may include compositions of varying component (e.g. salt, MgO, water, etc.) weight percentages. One or more dry portions 12 of a dry core may comprise varying thicknesses, densities, and other such factors. A wet core can be made in a similar fashion of one or more wet portions 14 of one or more compositions in the absence of one or more dry portions. The dry core can receive top layers as discussed above.

The use of a wet layer/portion 14 may offer advantages to the final MgO-based hybrid core 10. Such advantages may include, but are not limited to, temperature stability, water stability, rigidity, strength, and the ability to adhere to one or more dry layers/portions 12 upon processing. In such aspects, the aforementioned advantages provide a final MgO-based hybrid core 10 with the ability to resist warping (dimensional variation) and delamination when exposed to extreme conditions (e.g., temperature, pressure, water, etc.) in various applications in a variety of fields. Such fields include, but are not limited, to subflooring, decorative flooring, interior walls, exterior siding, structurally insulated panel (SIP) walls, modular construction, tile backer boards, interior decorating, carpentry, and other such related fields.

In such an aspect, the advantages of the wet layer/portion 14 described herein may relate to dendritic crystal formation. Dendritic crystal formation results from a curing reaction occurring between MgO and a salt of choice (e.g., MgCl$_2$, MgSO$_4$, etc.) in the presence of water. The increased water content of a wet portion 14 increases dendritic crystal formation during a curing reaction. In such aspects, various dendritic crystal structures may be formed by altering process parameters. Process parameters may include mixing conditions, curing conditions (e.g., temperature and humidity), and other such parameters known in the art. In an aspect, the strong dendritic crystal structure may sufficiently hold a product together in the face of stressors. Such stressors include, but are not limited to, elevated temperature, pressure, water, and other such stressors known in the art.

The one or more dry portions 12 and one or more wet portions 14 comprise vastly different viscosities, which would predict an inability to combine the two portions during a curing reaction. However, the current disclosure has shown that the ability of one or more dry portions 12 and one or more wet portions 14 to adhere to each other during a curing process, resulting in a hybrid core 10, therefore yielding unexpected results.

To form the hybrid core, the dry portion/layer 12 the dry MgO composition may be layered onto a surface 20 (e.g., see FIG. 1). In an aspect, a wet slurry of the wet MgO composition that forms the wet layer/portion 14 may be layered onto the dry portion/layer 12. In an additional aspect, a wet slurry may be layered onto other surfaces serving as carriers which would not sufficiently interact with the wet slurry. In other words, a carrier may be inert with respect to the wet slurry. In such instances, a wet slurry layered onto an inert carrier may be processed by itself to form a final wet portion core. Likewise, a dry portion/layer may be processed to form a dry product alone, as described above. These sole dry and wet cores can be utilized by themselves without additional dry or wet layers added, with top layers 400 added to each individual wet/dry core product. In addition, these pre-formed wet core and dry core products can be joined to one another.

In an aspect of the present disclosure, a hybrid core 10 comprising a dry portion 12 of the dry MgO composition with a wet portion 14 of the wet MgO composition layered onto the dry portion 12 may have more than two or three layers (e.g., dry 12/wet 14/dry 12; wet 14/dry 12/wet 14/dry 12; dry 12/wet 14/dry 12/wet 14/dry 12; etc.) applied to the hybrid core 10, as described below.

In an aspect, a hybrid core 10 includes a first dry portion/layer 12 of the dry MgO composition, a wet portion/layer 14 of the wet MgO composition layered onto the first dry portion 12, and a second dry portion/layer 12 of the dry MgO composition. That is, the wet portion/layer 14 may be sandwiched between the two dry portions/layers 12. The hybrid core 10 may undergo further processing. Further processing may be selected from processes including, but not limited to, pressing, hot pressing, scatter coating, extruding, smooth rolling, and other such processes.

During such processing, the hybrid core 10 undergoes a curing reaction. A curing reaction comprises a reaction between the one or more ingredients included in the dry portion 12 (dry MgO composition) and wet portion 14 (wet MgO composition). In some examples, the curing reaction may comprise a reaction between the one or more salts included in the dry MgO composition and the wet MgO composition, wherein the reaction forms a cement. The cement provides rigidity and other desired mechanical properties to the hybrid core 10. In such aspects, curing reactions occur at temperatures ranging from about ambient temperature up to about 150° F. and pressure ranging from about 280 psi up to about 855 psi. In such an aspect, ambient temperature includes but is not limited to the temperature of the environment surrounding the curing process at the beginning of a reaction. As non-limiting examples, ambient temperatures may include ranges from about 60° F. up to about 80° F. As previously stated, ranges are dependent on environment. In an aspect, curing reactions may be sped up using temperatures on the higher end of ranges disclosed herein (e.g. Le Chatelier's Principle).

As previously discussed, in some examples, the curing reactions are facilitated by the presence of water. Due to the higher water content of a wet layer/portion 14, the curing reaction in the wet portion 14 results in more prevalent creation of dendritic crystals, providing wet portions 14 with improved material properties. This occurrence allows the wet portion 14 to provide advantages (e.g. water stability, temperature stability, rigidity, and the like) to a hybrid core 10, while a dry portion 12 affords the core 10 the ability to be joined to outer layers 400 without additional adhesives, as described below. Bonding the outer layers (top layers 400) to the core 10 without adhesives or adhesive layers may provide improved bond strength between the outer layers and the core 10 (which also reduces or minimizes delamination) and improved manufacturing speed.

In an aspect, one or more top layers 400) may be added to the hybrid core 10. Such top layers 400 can be applied to the hybrid core 10 on one or more dry portion(s)/layer(s) 12 of a dry MgO composition. The top layer(s) 400 can be added for, among other things, improved decorative appearances (visuals of wood, stone, etc.), improved scratch resistance, water resistance, and other desired properties. As described above, the top layers 400 (or top layer) may include, but are not limited to, a décor layer, a wear layer, a protective coating, etc. In some example embodiment, the top layers 400 may be a single layer or at most two layers that operate as the décor layer, wear layer, and the protective coating. In other examples, the top layers 400 may be more than two layers without departing from a broader scope of the present disclosure. The top layer(s) 400 can include a material selected from a group including, but not limited to, melamine, phenolic resin papers, melamine impregnated papers, decorative papers, PVC films, melamine impregnated decorative papers, wood veneers, and other such materials known in the art. In such aspects, one or more top layers 400 can be applied through pressing, hot pressing, smooth rolling, and other such processes known in the art to one or more sides of a hybrid core 10. In such aspects, one or more top layers 400 is applied to one or more dry portion(s)/layer(s) 12 of a hybrid core 10, wherein the dry portion(s) 12 are oriented as the outermost surface(s) of the hybrid core 10.

In such aspects, the dry portion/layer 12 promotes the successful application of one or more top layers 400 to the hybrid core 10 without an adhesive via the elevated wood content and low water content of the dry MgO composition 12, as discussed above. In such aspects, water exiting one or more top layers 400 during application processes, as described above, can be absorbed into the dry portion(s)/layer(s) 12 of the hybrid core 10. Said absorption process promotes adhesion of the top layer(s) 400 to the hybrid core 10 by creating a dry interface. In such an aspect, a dry interface refers to the lowered level of moisture resulting at the interface of a dry portion 12 and one or more top layers 400 after or during an application process. In such an aspect, a dry interface includes the whole surface area wherein a dry portion 12 and one or more top layers 400 are disposed adjacent to each other. Were a significant level of water or other moisture to remain present at this interface, the hybrid core 10 and the one or more top layers 400 would not adhere. In such an aspect, water or moisture at the interface can lead to a slip-like failure, causing the hybrid core 10 and a top layer(s) 400 to separate, resulting in overall failure of a product.

As described above, the hybrid core 10 benefits from the advantageous aspects of both a dry portion 12 and a wet portion 14. In some processes, joining a wet portion 14 formed from a wet MgO composition to one or more top layers 400, such as a laminate, requires an additional adhesive. Joining one or more top layers 400 to a wet portion 14 using adhesive may not result in a bond strength that is as strong as the bond achieved between a hybrid core 10 and one or more top layers 400 without adhesives, as described herein. Adhesively bonded layers have a relatively higher chance of delamination. As a non-limiting example, a wet portion 14 and a top layer 400 bonded via adhesive may separate more easily than the bonding of a hybrid core 10 and a top layer 400 without adhesive. Requirements for additional adhesive may increase the cost of a hybrid core 10. Additional adhesives may also result in softer MgO-based products, leading to increased denting of the product in various applications. In such an aspect, the additional adhesive is softer when dried than an MgO-based product. This creates a soft internal layer between an MgO core 10 and a top layer 400 that is more significantly disposed to denting, cracking, and other related forms of damage. This occurrence requires a thicker top layer 400 (e.g., a laminate) to counteract the increased softness caused by an adhesive. The hybrid core 10, via the dry-process portion 12, eliminates such a need for additional adhesives. Eliminating needs for additional adhesives also increases the speed of manufacturing MgO-based products. The hybrid core 10 also retains important material properties, such as temperature stability, water stability, rigidity, strength, and the like through the use of wet portions 14. Insufficient water stability can lead to delamination, poor dent resistance, mold growth, mildew growth, and a variety of other such related disadvantages in a final MgO-based product. Likewise, while the use of only a wet process results in a product with improved temperature stability, water stability, rigidity, strength, and the like, the dry portion 12 of the hybrid core 10 allows the additional top layers 400 to be applied without additional adhesives. The use of a hybrid core 10 results in a final MgO product with one or more top layers 400 adhered to the core 10, via the dry-process portion 12 without additional additives, while experiencing the improved temperature stability, water stability, rigidity, strength, and the like, via the wet-process portion 14 of the core 10.

In such aspects, adhesion can be verified through tests known in the art including, but not limited to, a cross hatch test, a surface soundness test, and other such tests. In such aspects, temperature stability and water stability can be verified through tests known in the art including, but not limited to, a dimensional stability test, a thickness swelling test, and other such tests.

III. Manufacturing Process of Hybrid Core

Figure 3:
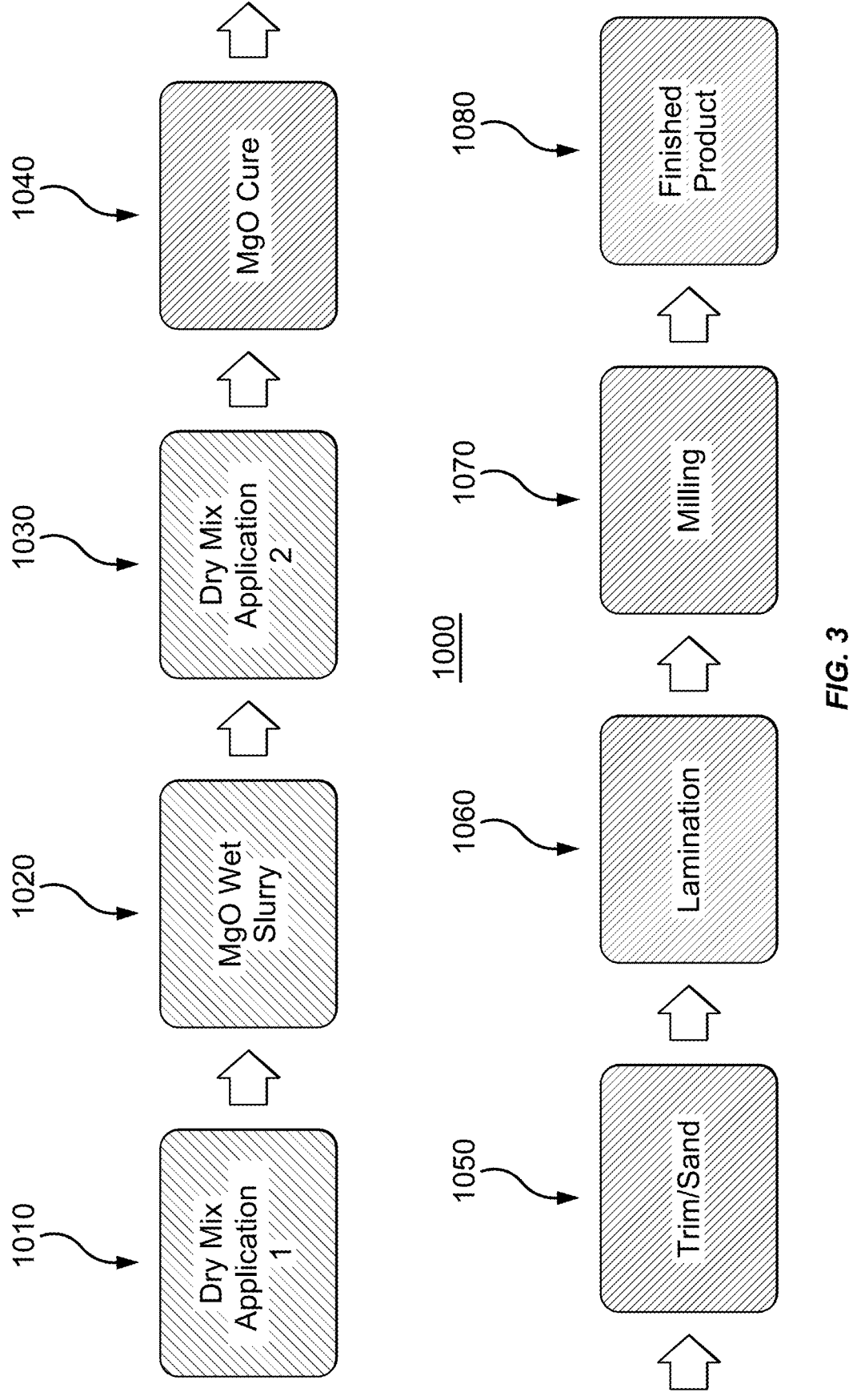
FIG. 3 illustrates an example hybrid MgO process according to aspects of the present invention.

As shown in FIGS. 1 and 3, a process 1000 of manufacturing a MgO-based hybrid core 10 includes first scattering a dry MgO composition onto a surface 20 (e.g., production line conveyor belt, caul plate, and other such surfaces known in the art) to form a first dry layer 100. The dry MgO composition can take the form of a dry powdered feedstock.

In such an aspect, the first layer 100 includes a first surface 102 (adjacent the conveyor belt 20), a second surface 104 opposite the first surface 102, and a thickness 110. In such aspects, the thicknesses 110 may be chosen depending on desired properties of the final MgO-based product. The composition of the first layer 100 (i.e. weight percentages of aforementioned components) may be designed depending on the desired properties of the first layer 100 in the hybrid core 10.

Next, a wet MgO composition can be applied to the first layer 100 to form a second layer 200. The wet MgO composition used to form the second layer 200 may be applied as a wet slurry. In such an aspect, a second layer 200 may comprise a thickness 210, as well as a first surface 202 and a second surface 204. In such an aspect, the second surface 104 of the first layer 100 is adjacent the first surface 202 of the second layer 200. In such aspects, the thickness 210 may be chosen depending on desired properties of the finished MgO-based product. The composition of the second layer 200 (i.e. weight percentages of aforementioned components) may be designed depending on the desired properties of the second layer 200 in the hybrid core 10.

In some instances, the second layer 200 and the first layer 100 can be formed separately from each other. In such an aspect, a wet slurry may be layered onto a surface serving as a carrier, wherein a carrier would not sufficiently interact with the wet slurry. A carrier may be described as being inert with respect to the wet slurry. In such instances, the second layer 200 layered on the inert carrier may then undergo subsequent processing (e.g. curing) to form a final product, as previously described. The final product formed from a wet MgO composition can then be transferred onto a pre-formed dry layer 100. In an aspect, layers individually formed from varying wet or dry MgO compositions can then be stacked and pressed to form a unified hybrid core 10. In such an aspect, one or more layers may be individually formed from one or more wet MgO compositions. In such an aspect, one or more layers may be individually formed from one or more dry MgO compositions. In such aspects, these various pre-formed layers may be stacked in a variety of orders and combinations. The stacked layers may then be formed into a unified hybrid core 10 through various processes. Processes include but are not limited to cold pressing, hot pressing, and other such processes known in the art. In an additional aspect, stacked, pre-formed layers may be formed into a unified hybrid core 10 through the use of adhesives. In an additional aspect, a combination of processes including but not limited to cold pressing, hot pressing, and the like and adhesives may be used.

In some aspects, layers of varying wet or dry MgO compositions may be separately layered, partially cured, and then stacked. As a non-limiting example, a layer of a wet MgO composition may be layered onto an inert carrier. Said layer may then be partially cured. On a separate surface, a layer of a dry MgO composition may be layered onto a surface. The layer of a dry MgO composition may then be partially cured. The two distinct layers may then be stacked onto each other in a given order. The partially cured, stacked layers may then undergo further processing. Such processing includes but is not limited to the completion of the partially executed curing processes. In such aspects, a wide variety of layers of varying compositions may undergo partial curing, stacking, and subsequent processing. As a non-limiting example, one or more layers of one or more wet MgO compositions and one or more layers of one or more dry MgO compositions may undergo partial curing stacking, and subsequent processing. As a non-limiting example, one or more layers of one or more wet MgO compositions may undergo partial curing stacking, and subsequent processing. As a non-limiting example, one or more layers of one or more dry MgO compositions may undergo partial curing stacking, and subsequent processing. Stacking may occur in a variety of orders and combinations.

In an additional aspect, a combination of partially cured and fully cured layers may be stacked. As a non-limiting example, a fully cured layer of a dry MgO composition may be placed onto a surface. A wet slurry may then be layered onto the fully cured layer of a dry MgO composition. The wet slurry may be partially cured. A second, fully cured layer of a dry MgO composition may then be layered on top of the partially cured, wet layer. This combination may then undergo further processing (e.g. curing) including applications of heat and/or pressure to form an MgO core where all layers are fully cured and bonded together. As a further non-limiting example, partially cured layers of dry MgO compositions can be layered onto a fully cured layer of a wet MgO composition. In such example, a partially cured layer of a dry MgO composition may be layered onto a surface. A fully cured layer of a wet MgO composition may then be layered onto the first dry layer. A second, partially cured layer of a dry MgO composition may then be layered onto the fully cured layer of a wet MgO composition. This combination may then undergo further processing (e.g. curing) including applications of heat and/or pressure to form an MgO core where all layers are fully cured and bonded together. Other combinations of partially cured and fully cured layers to form an MgO core are also conceived including the use of two, three, four, five, six, or more total layers comprising a variety of numbers of partially or fully cured dry and partially or fully cured wet layers.

After the formation of the second layer 200, a third layer 300, made of the dry MgO composition, can be scattered onto the surface 204 of the second layer 200, to form an additional dry-process portion 14. In such an aspect, the third layer 300 includes a thickness 310, a first surface 302, and a second surface 304. In such an aspect, the first surface 302 of the third layer 300 is oriented to be adjacent the second surface 204 (i.e., the exposed surface and opposite of the first layer 100) of the second layer 200. The composition of the third layer 300 (i.e. weight percentages of aforementioned components) may be designed depending on the desired properties of the third layer 300 in the hybrid core 10.

In an aspect, the dry MgO compositions of the first layer 100 and the third layer 300 may be the same. In an aspect, the dry MgO compositions of the first layer 100 and the third layer 300 may differ. In such an aspect, the dry MgO compositions of the one or more dry layers may comprise different weight percentages of MgO, one or more salts, wood, bamboo, latex, melamine, cellulose, acrylic, polypropylene (PP), polyethylene terephthalate (PET), hemp, natural fibers, synthetic fibers, water, and other such substances known in the art. By varying the compositions of one or more dry layers, a MgO-based product 10 may be afforded improved balancing. Balancing refers to evenly distributing internal tensions within a core 10 to produce a flat product. In such an aspect, using similar MgO compositions for the two outermost layers of a hybrid core 10 provides sufficient balancing. In such an aspect, the two outermost layers of a hybrid core 10 may sandwich a number of layers formed from a variety of wet or dry MgO compositions.

In aspects as described above, the thicknesses 110, 210, 310 of layers 100, 200, 300 may be chosen to make up desired portions of the total thickness of the overall hybrid core 10. In such an aspect, the combined thicknesses 110, 310 of the dry layers 100, 300 may comprise about 20% up to about 70% of the total thickness of a processed hybrid core 10 (e.g., after curing), though other ranges can be used. In an aspect, the first layer 100 of the dry MgO composition may be omitted if desired, resulting in a product of a layer 200 of a wet MgO composition abutted on its surface 204 by a layer 300 of a dry MgO composition with the remaining surface 202 free. In an additional aspect, the third layer 300 may be omitted if desired resulting in a product of a second layer 200 of a wet MgO composition abutted on its surface 202 by a layer 100 of a dry MgO composition with the remaining surface 204 free.

In an aspect, the layers 100, 200, 300 of the hybrid core 10 may be bonded together through application of elevated pressures, with or without elevated temperatures. Such processes may comprise hot pressing, cold pressing, smooth rolling, double belt continuous pressing, and other such processes known in the art. In such an aspect, elevated pressures may range from about 280 psi up to about 855 psi. In such an aspect, processes may occur at temperatures ranging from about ambient temperature up to about 150° F. and pressure ranging from about 280 psi up to about 855 psi. In such an aspect, ambient temperature includes but is not limited to the temperature of the environment surrounding the curing process at the beginning of a reaction. As non-limiting examples, ambient temperatures may include ranges from about 60° F. up to about 80° F. As previously stated, ranges are dependent on environment. In an aspect, the bonding will also occur during the curing process, as described above. As described above, a reaction occurring between MgO and a salt of choice (e.g., $MgCl_2$, $CaCO_3$, etc.) in the presence of water forms a cement, providing the MgO-based product 10 with strength and rigidity. Bonding of layer(s) 100, 300 of dry MgO compositions with wet layer(s) 200 of a wet MgO composition, as described above, provides a surprising result with advantageous effects, as it may be unexpected for layers of dry MgO compositions and layers of wet MgO compositions comprising vastly different viscosities to effectively bind.

In an aspect, intervening layers (not pictured) may be introduced between layers 100, 200, 300 or within the different layers 100, 200, 300 to provide additional properties. Such layers may comprise a material selected from a group consisting of fiberglass, polymers, and other such materials known in the art. Polymers include but are not limited to polyethylene terephthalate (PET), polypropylene. Polymers may be used in the form of polymer webs. Additional properties include but are not limited to increased product flexibility, increased profile strength, and other such desired properties known in the art.

A diagram displaying the hybrid process of preparing a MgO-based product 10 is shown in FIG. 1. In such diagram, the scattering of a dry MgO composition to form a first layer 100, the application of a wet MgO composition on the first layer 100 to form a second layer 200, the scattering of a dry MgO composition on the second layer 200 to form a third layer 300, and a subsequent bonding process are seen. In such an aspect, the hybrid core 10 may be described as an A-B-A product, wherein the first layer 100 and third layer 300 comprise dry MgO composition layers (i.e. "A") and the second layer 200 comprises a wet MgO composition layer (i.e. "B"). An example of such a hybrid core 10 is further displayed in FIG. 2.

In some examples, the first and third layers (100, 300) may comprise a wet MgO composition layer (i.e., 'A') and the second layer 200 may comprise a dry MgO composition layer (i.e., 'B'). In said example where layers A comprise a wet MgO composition, the wet MgO composition may have a higher percentage of wood or cellulose fibers (i.e., more than 20% wood fiber by weight). However, in some aspects, the wet MgO composition that forms the outer layers (i.e., A) as mentioned in above example may not have a higher percentage of wood.

Figure 4:
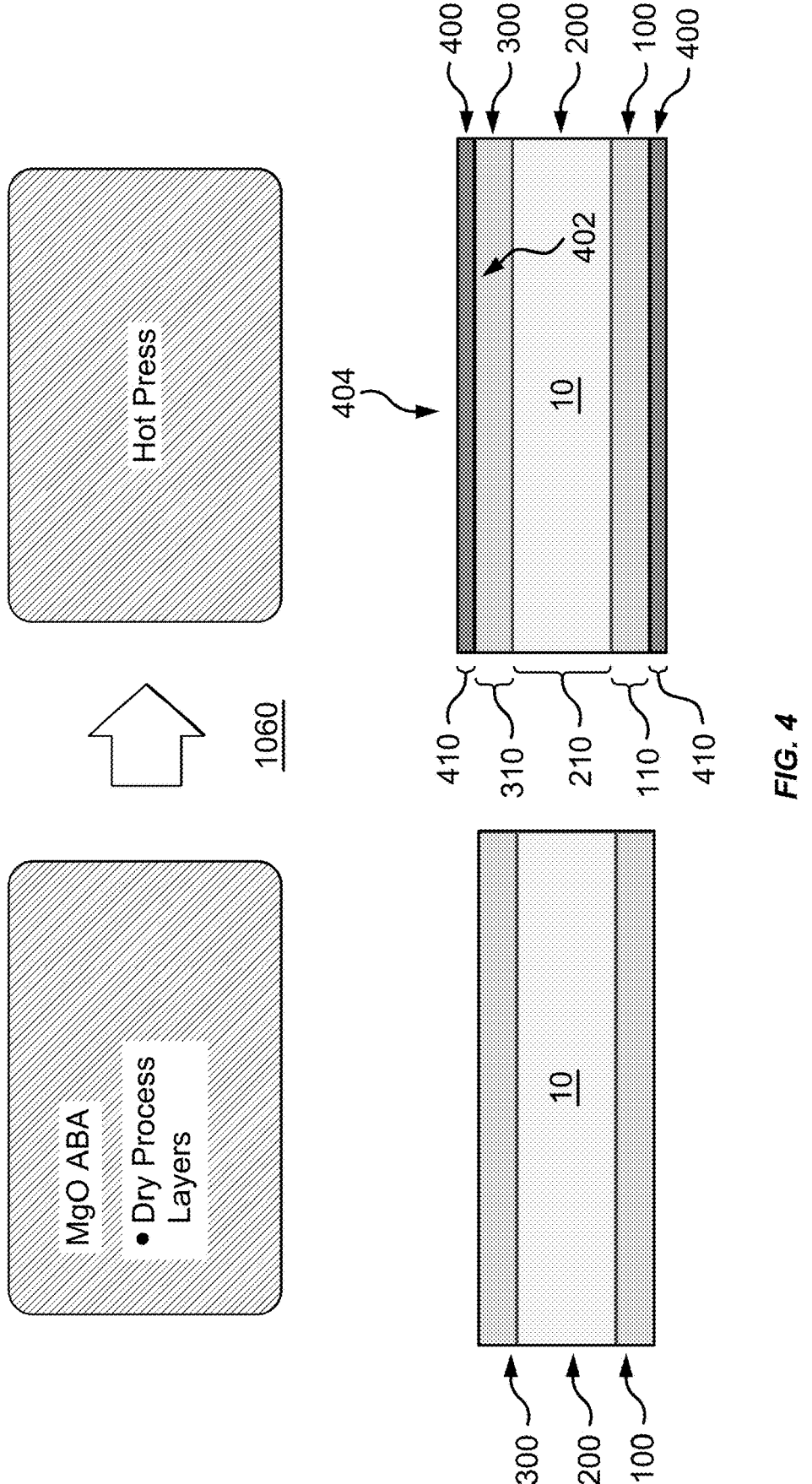
FIG. 4 illustrates a portion of an example hybrid MgO process according to an aspect of the present invention.

The hybrid core 10 described above can be joined to one or more top layers 400, comprising a first surface 402, a second surface 404, and a thickness 410, as shown in FIG. 4, and as discussed above. In such an aspect, the thickness 410 of the additional top layer(s) 400 may be selected depending on desired material properties of a final product. The additional top layer(s) 400 may be configured to be joined to the first surface 102 of the first layer 100 and/or the second surface 304 of the third layer 300, or both. In such an aspect, laminating the top layers 400 to both the first layer 100 and the third layer 300 provides proper balancing of the MgO-based product. In such an aspect, a hybrid core 10 can be sandwiched by top layers 400.

FIG. 3 shows additional steps in the process to form a finished MgO product with a hybrid core 10. The MgO product can be formed through a dry mix application 1010 (i.e., forming a layer of a dry MgO composition), applying a MgO wet slurry 1020 (i.e. forming a layer of a wet MgO composition), another application of a dry mix (i.e., adding a dry MgO composition) 1030, curing the MgO compositions to form the hybrid core 1040, trimming/sanding the formed hybrid core 1050, lamination 1060 of the sanded/trimmed hybrid core 10 (i.e., adding at least one top layer 400 of a laminate to the hybrid core 10), milling the laminated hybrid core 1070, and creation of the finished product 1080. In an additional aspect, a drying process can occur between curing the MgO compositions 1040 and laminating 1060 the hybrid core 10. Such a drying process can include flashing the hybrid core 10 at elevated pressures to remove water from the core 10. In doing so, the lamination process 1060 can be improved. In such an aspect, the application of a top layer 400 to a hybrid core 10 produces a stronger bond after water is removed from the core 10. Drying (e.g. flashing) can be done before or after sanding or trimming in step 1050. As a non-limiting example, drying (e.g. flashing) may be performed before trimming if the MgO core 10 emerging from the curing step 1040 contains an elevated water content that makes sanding inefficient. As a further non-limiting example, drying (e.g. flashing) may occur after a sanding or trimming step 1050 if one or more layers have been added to exterior surfaces of a hybrid core 10 during preceding steps. In such example, a thin polymeric layer (e.g. polypropylene (PP)) may have been added to exterior surfaces of a core 10 to prevent sticking of the core 10 to any machinery used in preceding steps. In such example, the thin polymeric layer must first be sanded off before drying (e.g. flashing) is performed. This allows water to more effectively escape the core 10 during drying (e.g. flashing).

Steps 1010-1040 can occur as described above. The hybrid core 10 can be sanded and trimmed according to those methods known in the art. The sanding/trimming 1050 can be done to prepare the hybrid core for lamination. From here, the lamination 1060 can occur. A further breakdown of the lamination step 1060 is displayed in FIG. 4. In such an aspect, application of one or more top layers 400 may occur on either side of a hybrid MgO-based core 10 through a hot press or cold press, though other processes known in the art may be used to achieve lamination 1060. Regarding the milling of the laminated hybrid core 1070, the milling can be done according to known methods to have the desired end finished product.

Although several aspects have been disclosed in the foregoing specification, it is understood by those skilled in the art that many modifications and other aspects will come to mind to which this disclosure pertains, having the benefit of the teaching presented in the foregoing description and associated drawings. It is thus understood that the disclosure is not limited to the specific aspects disclosed hereinabove, and that many modifications and other aspects are intended to be included within the scope of any claims that can recite the disclosed subject matter.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, can be executed out of order from that shown or discussed, including substantially concurrently or in reverse order, depending on the functionality involved, as would be understood by those reasonably skilled in the art of the present disclosure. Many variations and modifications can be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A magnesium oxide based product, the product comprising:
   a. a hybrid core, the hybrid core including:
      i. a dry layer comprising a dry MgO composition comprising magnesium oxide, one or more salts, wood, and water, wherein the dry MgO composition comprises at most about 5% water by weight and at least about 20% wood by weight; and
      ii. a wet layer comprising a wet MgO composition bonded to the dry layer, wherein the wet MgO composition comprises MgO, one or more salts, wood, and water, wherein the wet MgO composition comprises at least about 5% water by weight and at most about 20% wood by weight.

2. The magnesium oxide based product of claim 1, wherein the dry layer includes two dry layers sandwiching the wet layer.

3. The magnesium oxide based product of claim 2, wherein the two dry layers comprise about 20% up to about 70% of a product thickness.

4. The magnesium oxide based product of claim 1, further comprising an outer layer joined to the dry layer opposite the wet layer.

5. The magnesium oxide based product of claim 4, wherein the outer layer comprises a laminate.

6. The magnesium oxide based product of claim 5, wherein the laminate comprises melamine.

7. The magnesium oxide based product of claim 6, wherein the dry layer absorbs water from the melamine to create a dry interface between the dry layer and the melamine.

* * * * *